(12) United States Patent
Shahosseini et al.

(10) Patent No.: US 10,734,877 B2
(45) Date of Patent: Aug. 4, 2020

(54) ELECTROMAGNETIC ENERGY TRANSDUCER

(71) Applicant: THE REGENTS OF THE UNIVERSITY OF MICHIGAN, Ann Arbor, MI (US)

(72) Inventors: Iman Shahosseini, Ann Arbor, MI (US); Khalil Najafi, Ann Arbor, MI (US); Rebecca L. Peterson, Ann Arbor, MI (US)

(73) Assignee: THE REGENTS OF THE UNVERSITY OF MICHIGAN, Ann Arbor, MI (US)

( * ) Notice: Subject to any disclaimer, the term of this patent is extended or adjusted under 35 U.S.C. 154(b) by 719 days.

(21) Appl. No.: 15/317,318

(22) PCT Filed: Jun. 10, 2014

(86) PCT No.: PCT/US2014/041725
§ 371 (c)(1),
(2) Date: Dec. 8, 2016

(87) PCT Pub. No.: WO2015/191045
PCT Pub. Date: Dec. 17, 2015

(65) Prior Publication Data
US 2017/0126110 A1 May 4, 2017

(51) Int. Cl.
*H02K 35/00* (2006.01)
*H02K 35/02* (2006.01)
(Continued)

(52) U.S. Cl.
CPC ............. *H02K 35/00* (2013.01); *H02K 16/00* (2013.01); *H02K 33/00* (2013.01); *H02K 33/16* (2013.01); *H02K 35/02* (2013.01); *H02K 16/02* (2013.01)

(58) Field of Classification Search
CPC ........ H02K 16/02; H02K 16/00; H02K 35/00; H02K 35/16; H02K 35/02; H02P 25/06
(Continued)

(56) References Cited

U.S. PATENT DOCUMENTS 3,112,374 A 11/1963 Görike
5,574,367 A * 11/1996 Logue .................... B82Y 15/00
324/207.17

(Continued)

FOREIGN PATENT DOCUMENTS

CA 2173580 A1 4/1995
EP 0046006 A2 2/1982
(Continued)

OTHER PUBLICATIONS

International Search Report and Written Opinion of the ISA for PCT/US2014/041725, ISA/KR, Seo-gu, Daejeon Metropolitan City, dated Feb. 25, 2015.
(Continued)

*Primary Examiner* — Bryan R Perez
(74) *Attorney, Agent, or Firm* — Harness, Dickey & Pierce, P.L.C.

(57) ABSTRACT

An electromagnetic transducer includes a magnetic assembly and a coil assembly. The magnetic assembly may include an inner magnet subassembly and an outer magnet subassembly. The inner magnet subassembly and the outer magnet subassembly each have a plurality of axial magnets arranged in a stacked configuration with a spacer disposed between vertically adjacent axial magnets. The coil assembly includes an inner coil subassembly and an outer coil subassembly. The inner coil subassembly is disposed between the inner magnet subassembly and the outer magnet subassembly, and the outer coil subassembly is disposed around the outer magnet subassembly. The coil assembly and the
(Continued)

magnetic assembly are configured to move relative to each other.

21 Claims, 8 Drawing Sheets

(51) Int. Cl.
*H02K 33/16* (2006.01)
*H02K 16/00* (2006.01)
*H02K 33/00* (2006.01)
*H02K 16/02* (2006.01)

(58) Field of Classification Search
USPC .......................................... 310/12.12, 15–39
See application file for complete search history.

(56) References Cited

U.S. PATENT DOCUMENTS

| | | | |
|---|---|---|---|
| 6,220,719 B1 | 4/2001 | Vetorino et al. | |
| 6,798,090 B2 | 9/2004 | Cheung et al. | |
| 6,807,282 B2 | 10/2004 | Kaneda et al. | |
| 6,936,937 B2 | 8/2005 | Tu et al. | |
| 6,952,060 B2 | 10/2005 | Goldner et al. | |
| 7,654,540 B2 | 2/2010 | Parison et al. | |
| 7,719,416 B2 | 5/2010 | Arms et al. | |
| 8,450,866 B2 | 5/2013 | Despesse | |
| 8,723,375 B2 | 5/2014 | Hiura et al. | |
| 2003/0034697 A1* | 2/2003 | Goldner | B60G 17/0157 310/17 |
| 2003/0117032 A1* | 6/2003 | Komuro | H02K 1/278 310/156.08 |
| 2004/0066107 A1 | 4/2004 | Gery | |
| 2006/0208600 A1* | 9/2006 | Sahyoun | H02K 33/16 310/254.1 |
| 2009/0127976 A1 | 5/2009 | Ward et al. | |
| 2011/0193425 A1 | 8/2011 | Hiura et al. | |
| 2012/0091828 A1 | 4/2012 | Despesse | |
| 2012/0119595 A1* | 5/2012 | Choi | B06B 1/045 310/25 |
| 2012/0280516 A1 | 11/2012 | Moss | |
| 2012/0280592 A1* | 11/2012 | Penn | H02N 2/043 310/300 |
| 2013/0008157 A1 | 1/2013 | Zuo et al. | |
| 2013/0069486 A1 | 3/2013 | Vijayakumar | |
| 2013/0127175 A1* | 5/2013 | Zuo | B60G 17/06 290/1 A |
| 2014/0327328 A1* | 11/2014 | Puff | F16F 1/041 310/28 |
| 2015/0135869 A1 | 5/2015 | Jia et al. | |

FOREIGN PATENT DOCUMENTS

| | | |
|---|---|---|
| EP | 0990961 A1 | 4/2000 |
| EP | 1194002 A2 | 4/2002 |
| EP | 2346149 A1 | 7/2011 |
| JP | 2010-154688 A | 7/2010 |
| JP | 2012-531180 A | 12/2012 |
| KR | 10-1061591 B1 | 9/2011 |
| KR | 2013-0034818 A | 4/2013 |
| WO | WO-2013/175449 A2 | 11/2013 |

OTHER PUBLICATIONS

Antaki, James F. et al., "A Gait-Powered Autologous Battery Charging System for Artificial Organs," Artificial Heart and Lung Program and the Rehabilitation Technology Program, University of Pittsburgh, the Bioengineering Department, Carnegie Mellon University, Pittsburgh, Pennsylvania, and Nimbus, Inc., Rancho Cordova, California, 1995, pp. M588-M595.

\* cited by examiner

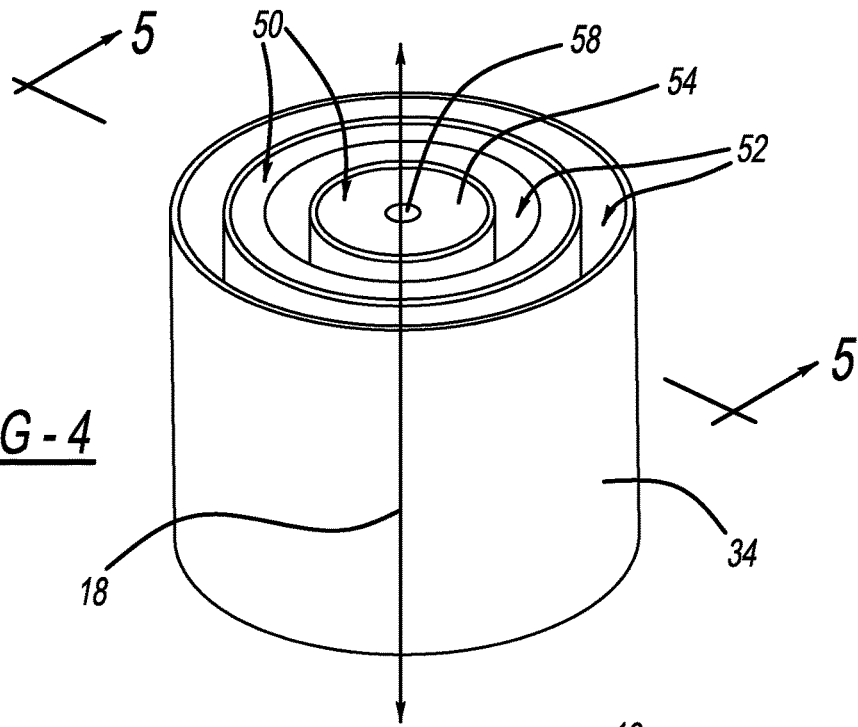
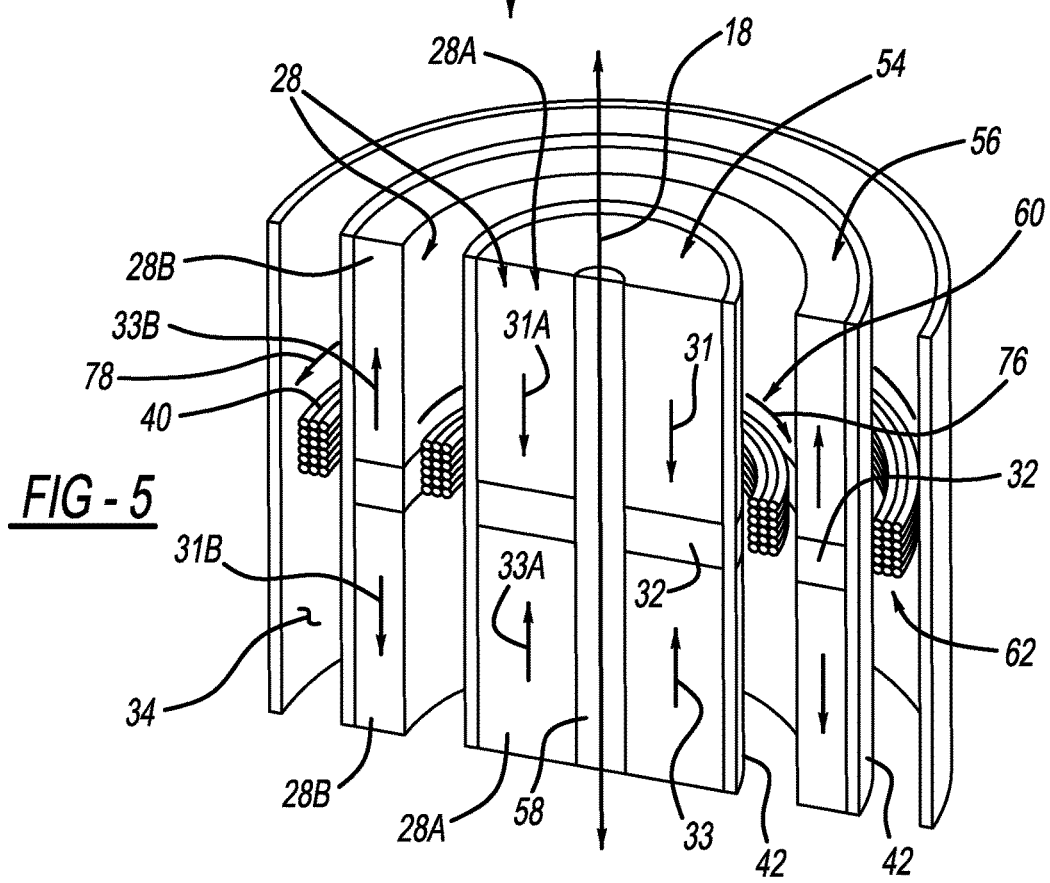

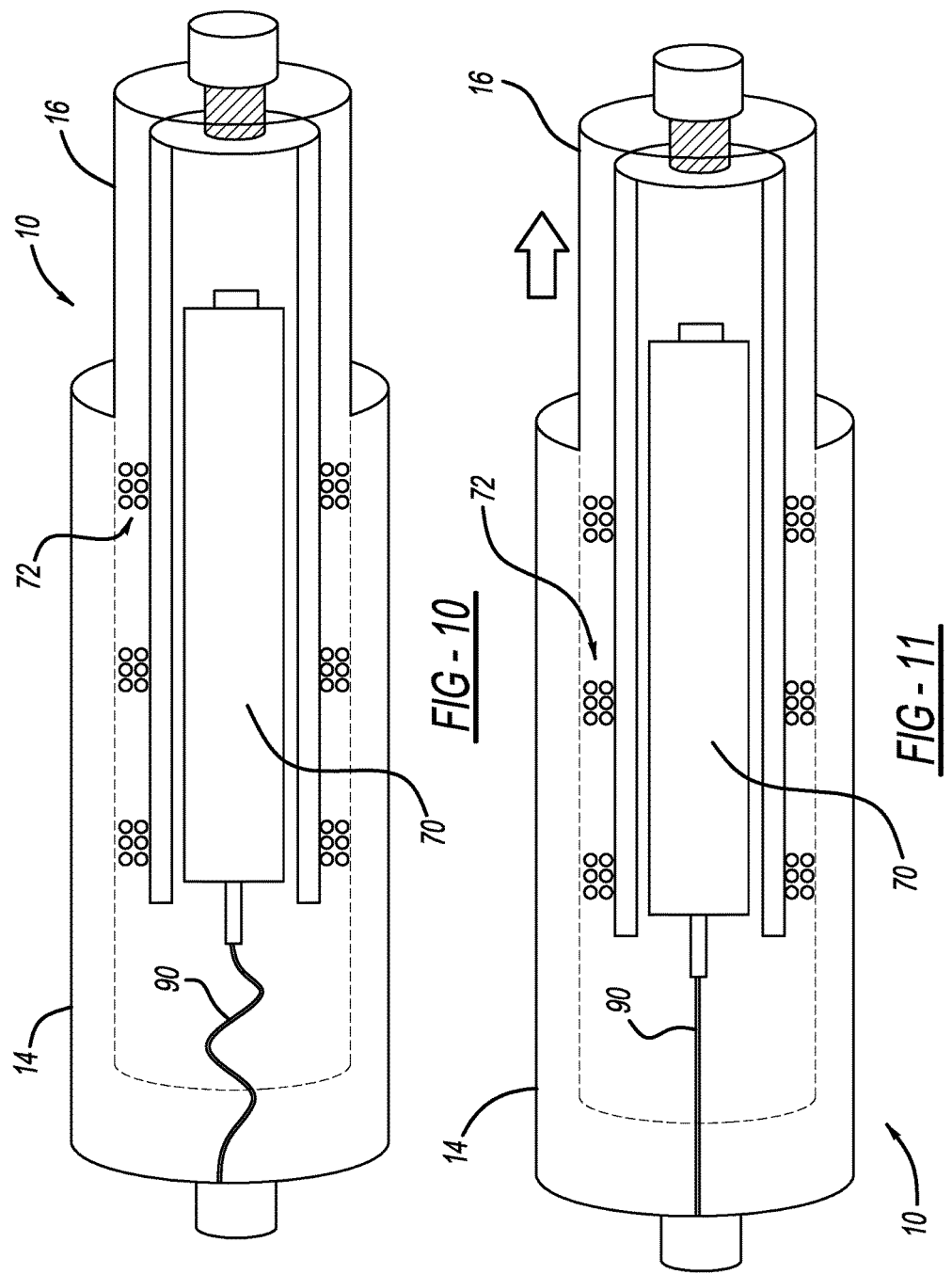

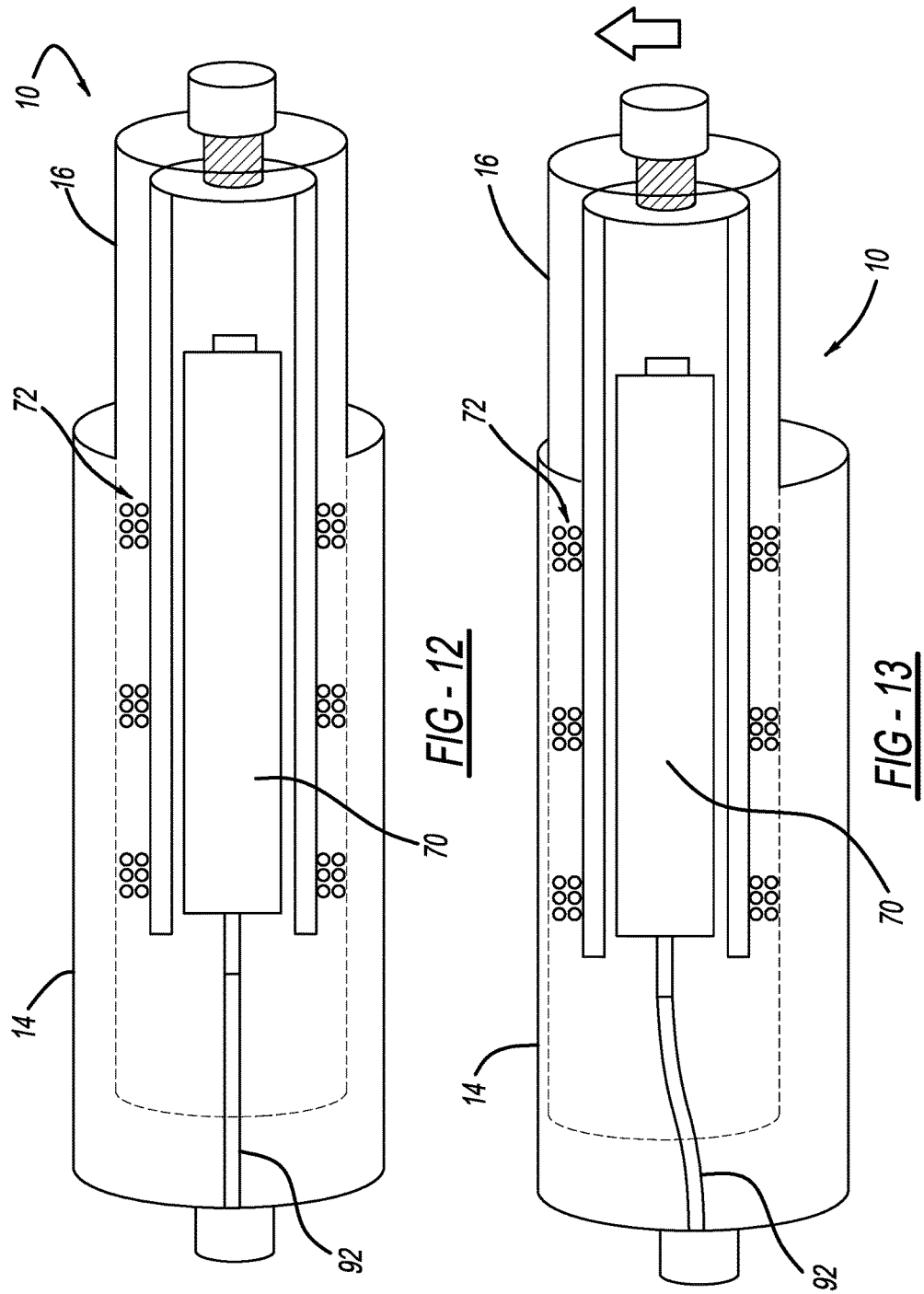

ELECTROMAGNETIC ENERGY TRANSDUCER

CROSS-REFERENCE TO RELATED APPLICATIONS

This application is a 371 U.S. National Stage of International Application No. PCT/US2014/041725, filed Jun. 10, 2014. The disclosures of the above application are incorporated herein by reference.

FIELD

The present disclosure relates to an electromagnetic energy transducer. More particularly, the present disclosure relates to the magnetic and the coil structures of the electromagnetic energy transducer.

BACKGROUND

Dynamic systems may include an electromagnetic transducer which converts kinetic energy from a vibration source to electrical energy. Such transducers can be used as an energy harvester. For example, as an energy harvester, the electromagnetic transducer transforms environmental vibrational energy to electrical energy which can be utilized to power an electronic device.

In addition to an energy harvester, an electromagnetic transducer may also be used as a sensor or an actuator. As a sensor the transducer can monitor the conditions of a dynamic system based on the vibrational energy being converted to electrical energy. As an actuator, the electromagnetic transducer further converts or translates the electrical energy to a mechanical motion.

Typically, the electromagnetic transducer is composed of a magnetic structure and a coil structure which move relative to one another. If the electromagnetic transducer is used as an energy harvester, the ambient kinetic energy moves the magnetic structure and the coil structure relative to each other. The relative movement causes a variation in the electromagnetic field, generated by the magnet structure, thereby generating electrical potential across the coil structure. If the electromagnetic transducer is utilized as both a sensor and a harvester, the variation in the generated electrical signal can be used to monitor the performance of the system. As an actuator, the electromagnetic transducer is coupled to a power source which injects electrical current in the coil structure. The electrical current interacts with the electromagnetic field created by the magnet structure. Such interaction generates an electromagnetic force which may move the coil structure respective to the magnetic structure.

Electromagnetic transducers are regularly employed in harsh environmental conditions that have high centrifugal acceleration, high axial and radial static displacements, torsional and tilting movements. For example, the electromagnetic transducers may be used in a car suspension, a helicopter lead-lag damper, railroad tracks, a bridge, etc. Accordingly, a transducer may be required to convert small vibration amplitudes and, at the same time, withstand static loads which have a higher amplitude than the vibration.

This section provides background information related to the present disclosure which is not necessarily prior art.

SUMMARY

This section provides a general summary of the disclosure, and is not a comprehensive disclosure of its full scope or all of its features.

An electromagnetic transducer is provided in the present disclosure. The electromagnetic transducer may include a first frame, a second frame, a magnetic assembly, and a coil assembly. The first frame defines a first opening, and is centered about a central axis. The second frame defines a second opening, and is centered about the central axis. The second frame is concentrically disposed in the first opening of the first frame, and the first frame and the second frame are configured to move relative to each other.

The magnetic assembly may include an inner magnet subassembly and an outer magnet subassembly disposed in the inner magnet subassembly. The inner magnet subassembly and the outer magnet subassembly may be centered about the central axis. The inner magnet subassembly and the outer magnet subassembly each have a plurality of axial magnets arranged in a stacked configuration with a spacer disposed between axial magnets that are adjacent in a direction parallel with the central axis. The axial magnets have a magnetization parallel with the central axis. The axial magnets of the inner magnet subassembly and of the outer subassembly may be arranged such that axial magnets that are adjacent in the direction parallel with the central axis have same poles facing each other, and the outer magnet subassembly has a pattern of magnetization inverse to the inner magnet subassembly.

The coil assembly may be centered along the central axis and concentrically disposed with the magnetic assembly. The coil assembly may include an inner coil subassembly having one or more coils and an outer coil subassembly having one or more coils. The inner coil subassembly is disposed between the inner magnet subassembly and the outer magnet subassembly. The outer coil subassembly is disposed around the outer magnet subassembly. The coil assembly and the magnetic assembly are housed in the second frame which is substantially disposed within the first frame, such that the coil assembly and the magnetic assembly move relative to each other.

In an aspect of the present disclosure, the magnetic assembly may include a magnetic shield concentrically disposed around the outer coil assembly of the coil assembly.

In an aspect of the present disclosure, the coils of the inner coil assembly and of the outer coil assembly may align with the spacers of the inner magnet assembly and the outer magnet assembly along an axis perpendicular to the central axis when the magnetic assembly and the coil assembly are stationary.

In an aspect of the present disclosure, the spacer can be made of a ferromagnetic material.

In an aspect of the present disclosure, the magnetic assembly may include a rod centered about the central axis. The rod may be concentrically disposed in the inner magnet subassembly and may be made of a paramagnetic material.

In an aspect of the present disclosure, inner coil assembly and the outer coil assembly may both include a tube. The one or more coils of the inner coil assembly and of the outer coil assembly are arranged on the tubes.

In an aspect of the present disclosure, a given axial magnet of the inner magnet subassembly may have a magnetization in a direction opposite of a given axial magnet of the outer subassembly that is adjacent to the given axial magnet of the inner magnet subassembly in a direction perpendicular to the central axis.

In an aspect of the present disclosure, the magnetic assembly is coupled to the first frame and the coil assembly is coupled to the second frame.

In an aspect of the present disclosure, the coil assembly is coupled to the first frame and the magnetic assembly is coupled to the second frame.

In another aspect, an electromagnetic transducer may include a first frame, a second frame, a magnetic assembly, and a coil assembly. The first frame defines a first opening and is centered about a central axis. The second frame defines a second opening and is centered about the central axis. The second frame may be concentrically disposed in the first frame, and the first frame and the second frame are configured to move relative to each other.

The magnetic assembly may be centered about the central axis and may include a plurality of axial magnets and one or more radial magnets arranged in a stacked configuration, such that the plurality of axial magnets and the one or more radial magnets form a Halbach array. The coil assembly may be centered about the central axis and may include one or more coils. The magnetic assembly is concentrically disposed within the coil assembly. The coil assembly and the magnetic assembly are housed in the second frame which is substantially disposed within the first frame, such that the coil assembly and the magnetic assembly move relative to each other.

In an aspect of the present disclosure, the axial magnets of the magnetic assembly have a magnetization parallel with the central axis, and the one or more radial magnets of the magnetic assembly have a magnetization perpendicular to the central axis.

In an aspect of the present disclosure, the magnetic assembly disposed in the coil assembly is an inner magnetic assembly, and the electromagnetic transducer may further include an outer magnetic assembly. The outer magnetic assembly may be centered about the central axis and may be concentrically disposed around the coil assembly. The outer magnetic assembly is coupled to the inner magnetic assembly. The outer magnetic assembly includes a plurality of axial magnets and one or more radial magnets arranged in a stacked configuration, such that the plurality of axial magnets and the one or more radial magnets form the Halbach array. A given radial magnet of the outer magnetic assembly has same magnetization direction as a given radial magnet of the inner magnetic assembly that is adjacent to the given radial magnet of the outer magnetic assembly in a direction perpendicular to the central axis. A given axial magnet of the outer magnetic assembly has an opposite magnetization direction as a given axial magnet of the inner magnetic assembly that is adjacent to the given axial magnet of the outer magnetic assembly in the direction perpendicular to the central axis.

In an aspect of the present disclosure, the magnetic assembly may include a rod made of a paramagnetic material. The rod may be centered about the central axis, and the axial magnets and the one or more radial magnets may be concentrically disposed around the rod.

In an aspect of the present disclosure, the coils of the coil assembly may align with the radial magnets of the magnetic assembly along an axis perpendicular to the central axis when the magnetic assembly and the coil assembly are stationary.

In an aspect of the present disclosure, the electromagnetic transducer may further include a wire. The wire couples one of the first frame and the second frame to one of the magnetic assembly and the coil assembly.

In an aspect of the present disclosure, the electromagnetic transducer may further include a beam member. The beam member may include a rod which is moveable along an axis parallel with the central axis. The beam member couples one of the first frame and the second frame to one of the magnetic assembly and the coil assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a perspective view of a second example of a magnetic assembly and a coil assembly of the electromagnetic transducer;

FIG. 5 is cross-sectional view of FIG. 4 along line 5-5;

FIGS. 10 and 11 illustrate the electromagnetic transducer having a wire which can couple the magnetic assembly or the coil assembly to its respective frame; and FIGS. 12, 13, and 14 illustrate the electromagnetic transducer having a beam which can couple the magnetic assembly or the coil assembly to its respective frame.

Corresponding reference numerals indicate corresponding parts throughout the several views of the drawings.

DETAILED DESCRIPTION

Figure 1:
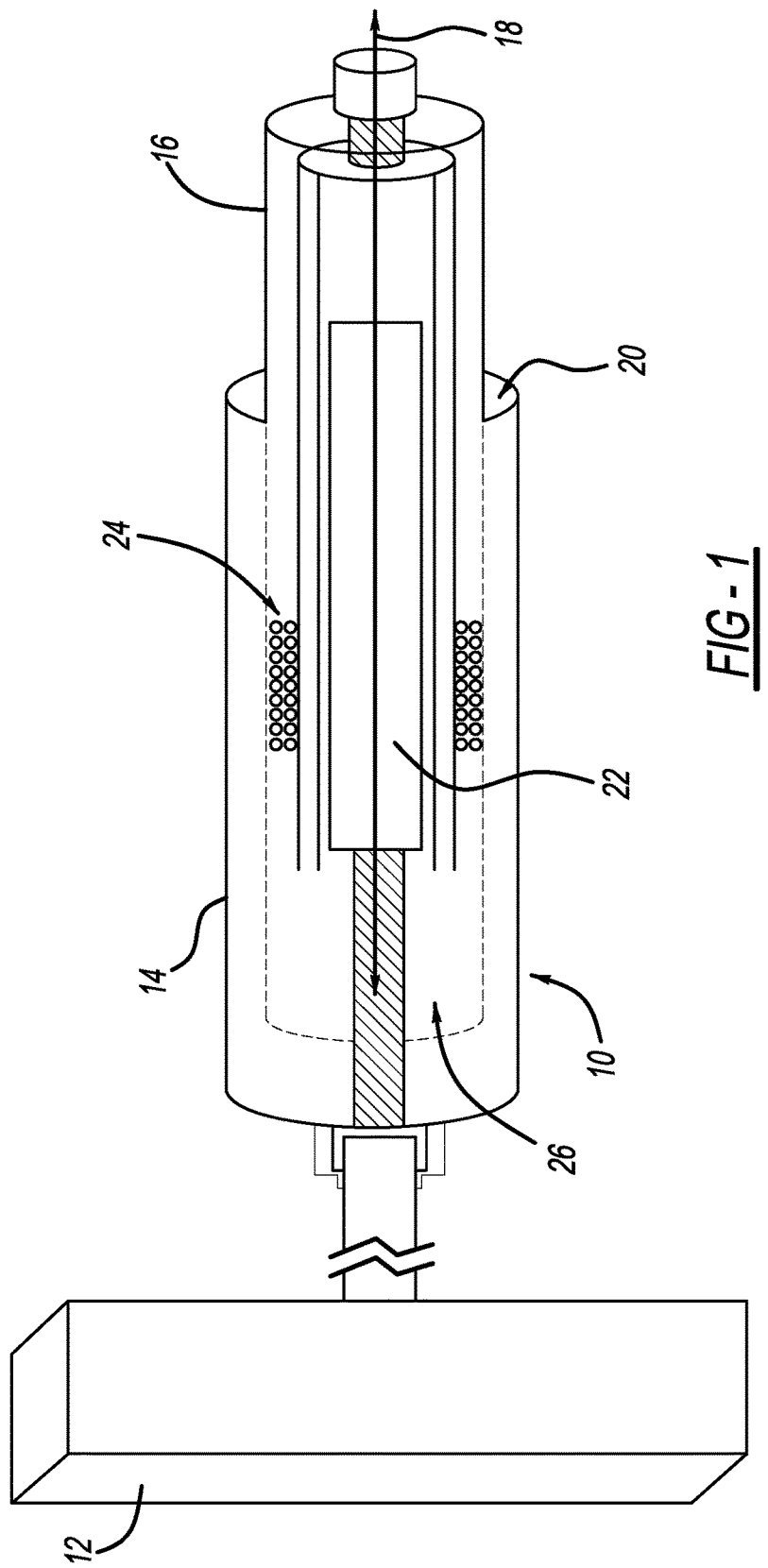
FIG. 1 illustrates a vibration source coupled to an electromagnetic transducer having a magnetic assembly and a coil assembly.

Example embodiments will now be described more fully with reference to the accompanying drawings. With reference to FIG. 1, an example of an electromagnetic transducer 10 is presented. The electromagnetic transducer 10 may perform as an energy harvester for transforming environmental vibrational energy from a vibration source 12 (i.e., an energy source) to electrical energy. The electrically energy may be utilized to power an electronic device (not shown). While the electromagnetic transducer 10 is discussed as an energy harvester, it is understood that the electromagnetic transducer 10 may also be employed as a sensor or an actuator. For example, as an actuator, the electromagnetic transducer 10 may be coupled to an electrical power source (i.e, an energy source) instead of the vibration source 12.

The electromagnetic transducer 10 includes two frames 14, 16 (a first frame 14 and a second frame 16) that are centered about a central axis 18. The first frame 14 defines an opening 20 which receives the second frame 16. The second frame 16 is substantially disposed within the first frame 14, such that the first frame 14 and the second frame 16 are concentric with each other. The frames 14, 16 slidingly move along the central axis 18. For example, one frame may be fixed in place while the other frame moves.

Alternatively, both frames may move relative to each other. While the frames 14, 16 are depicted as having a cylindrical body, it is understood that the frames 14, 16 may have another suitable shape, such as a cuboid, and is not limited to the cylindrical body depicted.

The electromagnetic transducer 10 further includes a magnetic assembly 22 and a coil assembly 24. The magnetic assembly 22 and the coil assembly 24 are centered about the central axis 18, and are disposed in the second frame 16 and the first frame 14. Specifically, the second frame 16 defines an opening 26 which receives the magnetic assembly 22 and the coil assembly 24. The magnetic assembly 22, the coil assembly 24, and the second frame 16 are disposed in the first frame 14. Thus, the magnetic assembly 22, the coil assembly 24, and the two frames share the same center (i.e., are concentric with each other).

The magnetic assembly 22 is coupled to one of the frames (e.g., first frame 14) and the coil assembly 24 is coupled to the other frame (e.g., second frame 16). The magnetic assembly 22 and the first frame 14 can be considered a first piece of the electromagnetic transducer 10. The coil assembly 24 and the second frame 16 can be considered a second piece the electromagnetic transducer 10. Accordingly, the two pieces of the electromagnetic transducer 10 are configured to move relative to each other about the central axis 18.

Figure 2:
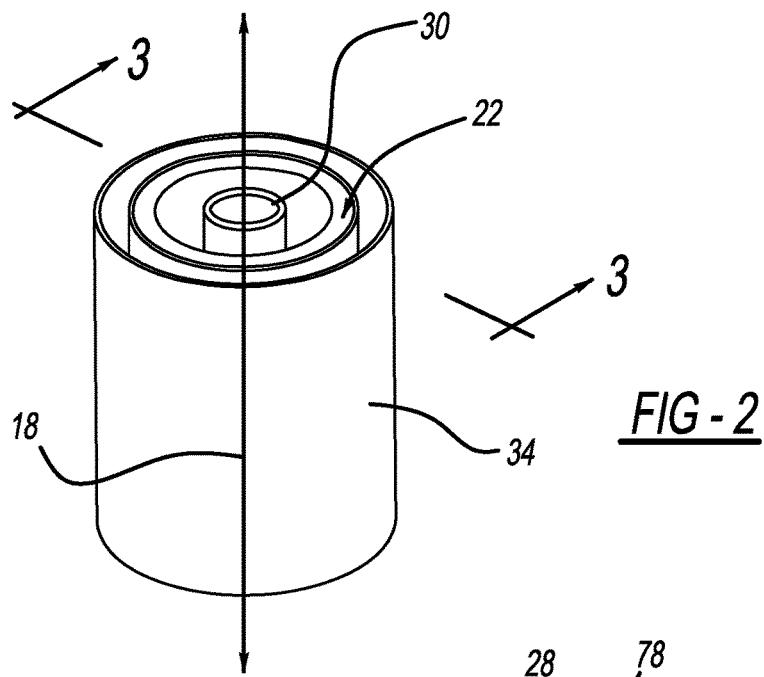
FIG. 2 is a perspective view of a first example of a magnetic assembly and a coil assembly of the electromagnetic transducer.
Figure 3:
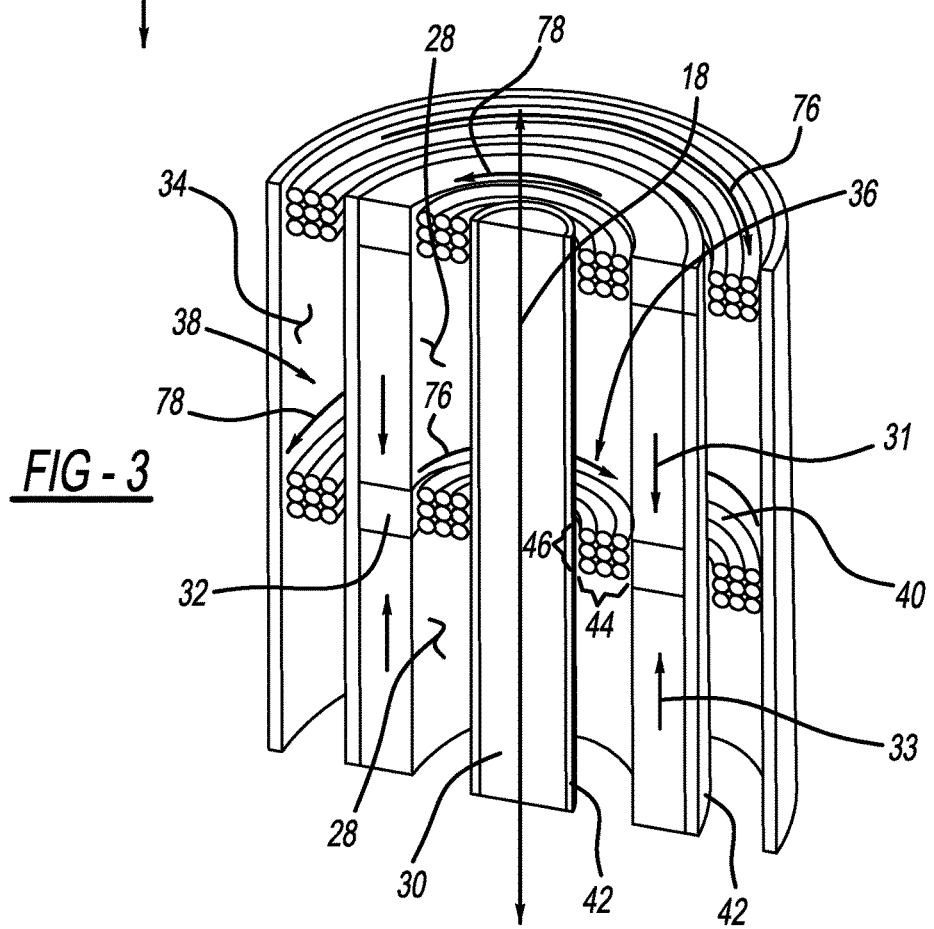
FIG. 3 is cross-sectional view of FIG. 2 along line 3-3.

With reference to FIGS. 2-3 an example of the magnetic assembly 22 and the coil assembly 24 is presented. The magnetic assembly 22 includes a plurality of magnets 28 concentrically disposed about a rod 30. The magnets 28 are arranged in a stacked configuration with a spacer 32 disposed between vertically adjacent magnets 28. The spacer 32 is made of a ferromagnetic material.

The magnets 28 are permanent magnets having a magnetization in a direction parallel with the central axis 18. The magnets 28 may also be known as axial magnets. The magnets 28 are arranged such that two adjacent magnets have the same pole facing each other. For example, the north poles of two adjacent magnets 28 face each other, indicated by arrows 31, 33 in FIG. 3. While the magnetic assembly 22 is depicted as having two axial magnets 28 which have one spacer 32 disposed between the magnets 28, it is understood that the magnetic assembly 22 may include additional axial magnets 28 and/or spacers 32.

The magnetic assembly 22 may include a magnetic shield 34 concentrically disposed around the plurality of magnets 28 and the rod 30. The magnetic shield 34 can be made of a ferromagnetic material. The magnets 28, the spacer 32 and the magnetic shield 34 are coupled together to move as one piece as the magnetic assembly 22. Various suitable methods may be employed to couple the components of the magnetic assembly 22, such as adhesives, washer, screws, soldering, etc.

The coil assembly 24 includes two coil subassemblies 36, 38 which include coils 40. More particularly, an inner coil subassembly 36 is disposed between the magnets 28 and the rod 30, and an outer coil subassembly 38 is disposed between the magnetic shield and the magnets 28. The inner coils subassembly 36, the magnets 28, the rod 30, and the outer coils subassembly 38 are centered about the central axis 18, and are, therefore, concentric with each other.

The inner coil subassembly 36 and the outer coil subassembly 38 each include the coils 40 which are disposed around a tube 42. The tube 42 is a low friction tube having a thin thickness to minimize the distance between the coils 40 and the magnets 28. For example, the tube 42 may be made of Teflon, and have a thickness of a few hundreds of a micron or other suitable value. The coils 40 are wound alternatively clockwise and counter-clockwise around the tube 42, as indicated by arrows 76, 78. Also, the coils 40 of the inner coil subassembly 36 are wound in opposite direction of the coils 40 of the outer coil subassembly 38 as indicated in FIG. 3.

The two coil subassemblies 36, 38 are coupled together to move as one piece as the coil assembly 24. Various suitable methods may be employed to couple the components of the coil assembly 24, such as adhesives, washer, screws, soldering, etc. In the assembled condition and non-moving state, the coils 40 of the coil assembly 24 are positioned adjacent to the ferromagnetic spacer 32 of the magnetic assembly 22. In the example embodiment, the two coil subassemblies 36, 38 include the tube 42 which align the coils 40 and can be used to couple the subassemblies 36, 38 together. It is understood that the coil subassemblies 36, 38 may be configured in various suitable ways for aligning and coupling the coils 40, and are not limited to the configurations depicted in the figures. For example, the coils 40 may be wound and then coupled via a pin which align the coils 40 to their proper position. The coils 40 may also be wound around a bobbin which is then coupled to the pin.

One of the objectives in designing the electromagnetic transducer 10 is to maximize the output power of the electromagnetic transducer 10. The output power of an electromagnetic transducer can be determined by Equation 1, where $P_{out}$ is output power, $V_{source}$ is induced voltage in the coils 40, and $R_{source}$ is the coils 40 electrical resistance. Using Faraday's law of induction, as shown in Equation 2, the output power can further be represented by Equation 3, where N is the number of coil turns, $\varphi$ is magnetic flux, t is time and z is displacement.

$$P_{out} \propto \frac{(V_{source})^2}{R_{source}} \qquad \text{Equation 1}$$

$$|V_{source}| = N\frac{d\varphi}{dt} \qquad \text{Equation 2}$$

$$P_{out} \propto \frac{N^2}{R_{source}}\left(\frac{d\varphi}{dz}\right)^2\left(\frac{dz}{dt}\right)^2 \qquad \text{Equation 3}$$

Based on Equation 3, the output power of the electromagnetic transducer is dependent upon three factors: coil parameter $$\left(\frac{N^2}{R_{source}}\right);$$

variation in magnetic flux $$\left(\left(\frac{d\varphi}{dz}\right)^2\right),$$

and velocity of the vibration source which is transferred to the electromagnetic transducer $$10\left(\left(\frac{dz}{dt}\right)^2\right).$$

The velocity can be modified via an amplifier coupled between the electromagnetic transducer 10 and the vibration source 12.

The coil parameter depends on the material of the coil and the space available for the coil turns. Specifically, to optimize the coil parameter, the number of coil layers (i.e., coil thickness—reference number 44 in FIG. 3) and the number of coil turns per layer (coil length—reference number 46 in FIG. 3) can be adjusted. It is preferred that the coil turns are as compact as possible to minimize the amount of air gaps between. Furthermore, the coil length is preferably greater than a thickness of the spacer 32. The coils 40 can be made of, for example, copper or nickel.

The variation in magnetic flux depends on the design of the magnetic structure or, in other words, the magnetic assembly 22. Due to the presence of high static displacement, it is preferred that the movement between the magnetic assembly 22 and the coil assembly 24 has minimum friction. Accordingly, the inner surface of the tube 42, which interfaces with the magnets 28, should be smoother than the outer surface, which has the coils 40 wound thereon.

With regard to the magnetic assembly 22 and the coil assembly 24 of FIGS. 2 and 3, the inner coil subassembly and the outer coil subassembly are situated in the path of the electromagnetic field generated by the magnetic assembly 22. The ferromagnetic rod 30 and the magnetic shield 34 guide the electromagnetic field through the coil turns. Movement between the coil assembly 24 and the magnetic assembly 22 cause a variation in the electromagnetic field.

While the rod 30 can be made of ferromagnetic material, it may also be made of a paramagnetic material. With a paramagnetic rod, the coil assembly 24 may only include the outer coil subassembly 38. More particularly, the coils 40 originally wrapped on the ferromagnetic rod are no longer required. A ferromagnetic rod may yield a higher output power density than the paramagnetic rod. Specifically, the generated magnetic field on both sides of the magnets, inside and outside, are exploited by the coils 40 to generate power. Furthermore, it is understood that the magnet assembly 22 and the coil assembly 24 may include additional stacks of magnets 28, spacers 32, and coils 40, and is, therefore, not limited to the configuration depicted.

With reference to FIGS. 4 and 5, to further maximize the variation in magnetic flux, the electromagnetic transducer 10 may include a dual magnetic assembly 50 and a coil assembly 52. The magnetic assembly 50 includes two magnet subassemblies 54, 56 each having the plurality of axial magnets 28. More particularly, an inner magnet subassembly 54 is disposed in an outer magnet subassembly 56. The magnetic assembly 50 further includes a rod 58, which is made of a paramagnetic material. The rod 58 is disposed in the inner magnet subassembly 54, and can be utilized to assemble and align the two magnet subassemblies 54, 56. The paramagnetic rod 58 prevents attracting the electromagnetic field toward the center of the magnetic assembly 50, where there is no conductor (i.e., coils).

The plurality of magnets 28A of the inner magnet subassembly 54 are arranged in a stacked configuration with the spacer 32 disposed between two vertically adjacent magnets. The plurality of magnets 28A are arranged such that two vertically adjacent magnets 28A have the same pole facing each other, as indicated by arrows 31, 33 in FIG. 5. Similarly, the plurality of magnets 28B of the outer magnet subassembly 56 are arranged in a stacked configuration with the spacer 32 disposed between two vertically adjacent magnets. The plurality of magnets 28B are also arranged such that two vertically adjacent magnets 28B have the same pole facing each other, as indicated by arrows 31, 33 in FIG. 5. The outer magnet subassembly 56 has a pattern of axial magnetization opposite to the inner magnet subassembly 54. Specifically, a given magnet 28B of the outer magnet subassembly 56 has an axial magnetization opposite of a horizontally adjacent magnet 28A of the inner magnet subassembly 54, as indicated by arrows 31A, 31B, 33A, and 33B.

The magnetic assembly 50 further may include the magnetic shield 34 which is disposed around the outer magnet subassembly 56. The rod 58, the inner magnet subassembly 54, the outer magnet subassembly 56, the spacers 32, and the magnetic shield 34 are centered about the central axis 18 and are concentric with each other. Furthermore, the rod 58, the inner magnet subassembly 54, the outer magnet subassembly 56, the spacers 32, and the magnetic shield 34 are coupled together to move as one piece as the magnetic assembly 50.

The coil assembly 52 includes an inner coil subassembly 60 and an outer coil subassembly 62, where the inner coil subassembly 60 is disposed in the outer coil subassembly 62. Both coil subassemblies 60, 62 include the tube 42 and coils 40. While FIG. 5 depicts one coil 40 for both coil subassemblies 60, 62, more than one coil 40 may be utilized, where the coils 40 are wound alternatively clockwise and counterclockwise.

The two coil subassemblies 60, 62 are centered about the central axis 18, and are concentric with each other. Furthermore, the two coil subassemblies 60, 62 are coupled together to move as one piece as the coil assembly 52. The inner coil subassembly 60 is disposed between the inner magnet subassembly 54 and the outer magnet subassembly 56. The outer coil subassembly 62 is disposed between the outer magnet subassembly 56 and the magnetic shield 34. The electromagnetic field from the outer coil subassembly 62 is guided by the magnetic frame 34. In the assembled condition and non-moving state, the coils 40 of the coil assembly 52 are positioned adjacent to the ferromagnetic spacers 32 of the magnetic assembly 50.

In the example embodiment shown in FIGS. 4 and 5, one set of coils 40 is sandwiched between the magnet subassemblies 54, 56, and the other set of coils 40 is sandwiched between the magnetic shield 34 and one magnet subassembly 56. The inner magnet subassembly 54 guides the electromagnetic field of the first set of coils 40 (i.e., coils 40 of the inner coil assembly 60), and the magnetic shield 34 and the outer magnet subassembly 56 guide the electromagnetic field of the second set of coils 40 (i.e., coils 40 of the outer coil assembly 62). Furthermore, the inner magnet subassembly 54 also increases the magnetic field of the inner coils assembly 60, thereby increasing the power density of the transducer.

Figure 6:
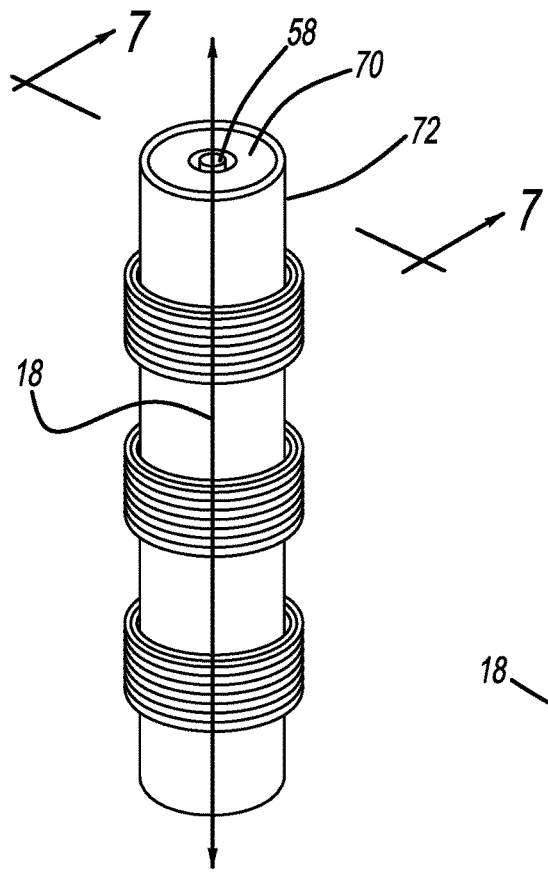
FIG. 6 is a perspective view of a third example of a magnetic assembly and a coil assembly of the electromagnetic transducer.
Figure 7:
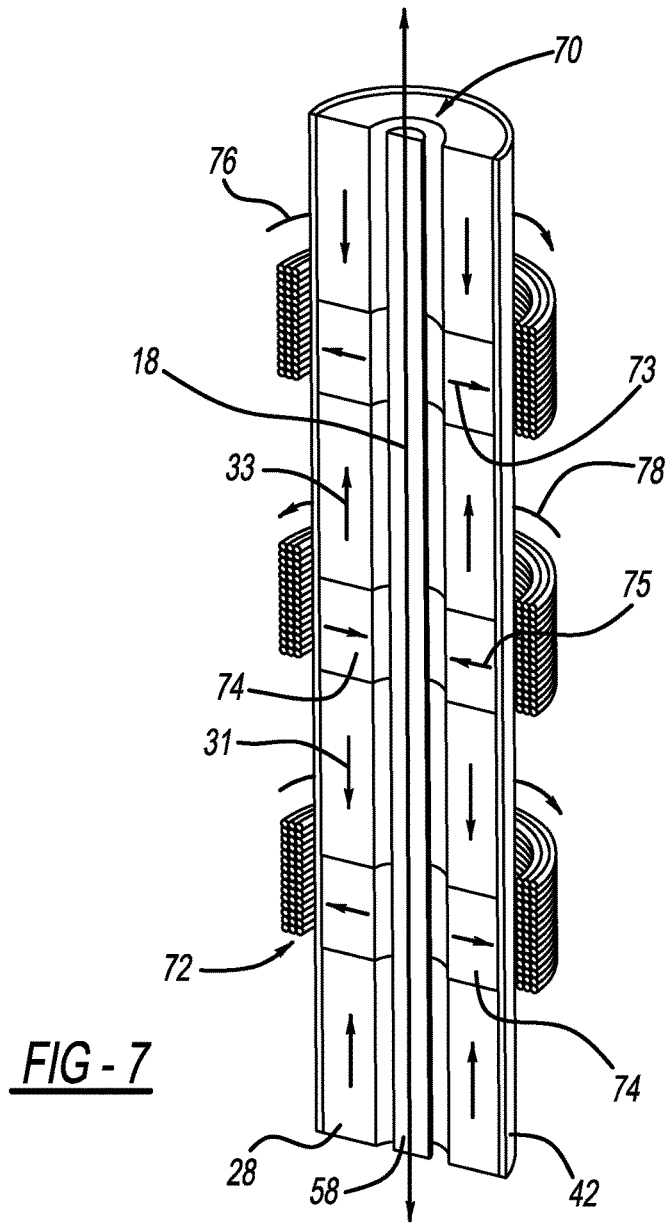
FIG. 7 is cross-sectional view of FIG. 6 along line 7-7.

The magnetic assemblies 22 and 50 include the ferromagnetic spacer 32 to guide the electromagnetic field to the coils 40. In lieu of the ferromagnetic spacer 32, a radial magnet may be employed. More particularly, as shown in FIGS. 6-7, the electromagnetic transducer 10 may include a magnetic assembly 70 and a coil assembly 72. The magnetic assembly 70 includes a plurality of axial magnets 28 and a plurality of radial magnets 74 concentrically disposed about the paramagnetic rod 58.

The radial magnets 74 are permanent magnets having a horizontal magnetization or a magnetization perpendicular to the central axis 18. The radial magnets may be arranged, such that its vector points toward the central axis or away, as indicated by arrows 73, 75 in FIG. 7. The plurality of axial magnets 28 and the plurality of radial magnets 74 are arranged to form a Halbach array. Specifically, a successive arrangement of four different magnetization directions (e.g., up, down, right, and left) are used to form the Halbach array. The rod 58, the plurality of axial magnets 28, and the plurality of radial magnets 74 are coupled together to move as one piece as the magnetic assembly 70.

The coil assembly 72 includes the tube 42 and multiple coils 40, which are wound alternatively clockwise and counter-clockwise around the tube 42, as indicated by arrows 76, 78. The magnetic assembly 70 is disposed in the coil assembly 72, such that the magnetic assembly 70 and the coil assembly 72 are concentric with each other. In the assembled condition and non-moving state, the coils 40 of the coil assembly 72 are positioned adjacent to the radial magnets 74 of the magnetic assembly 70.

The variation in magnetic flux generated by the magnetic assembly 70 may be controlled by the following variables: the height of the radial magnets 74, the height of the axial magnets 28, the outer diameter of magnets, and the coil length. Furthermore, the Halbach array is a special arrangement of permanent magnets that strengthens the electromagnetic magnetic field on one side of the array while cancelling the field to near zero on the other side. Here, the magnetic assembly 70 strengthens the electromagnetic field provided on the outer perimeter and substantially cancels the electromagnetic field at the center of the magnetic assembly 70. Accordingly, by using the Halbach array arrangement, the variation in magnetic flux of the electromagnetic transducer is improved, thereby increasing the power output of the electromagnetic transducer 10.

Figure 8:
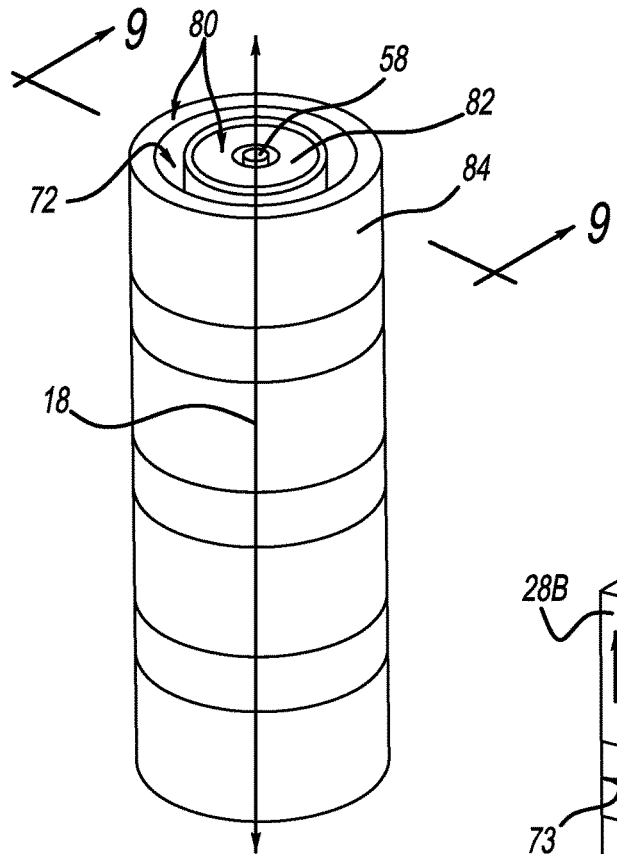
FIG. 8 is a perspective view of a fourth example of a magnetic assembly and a coil assembly of the electromagnetic transducer.
Figure 9:
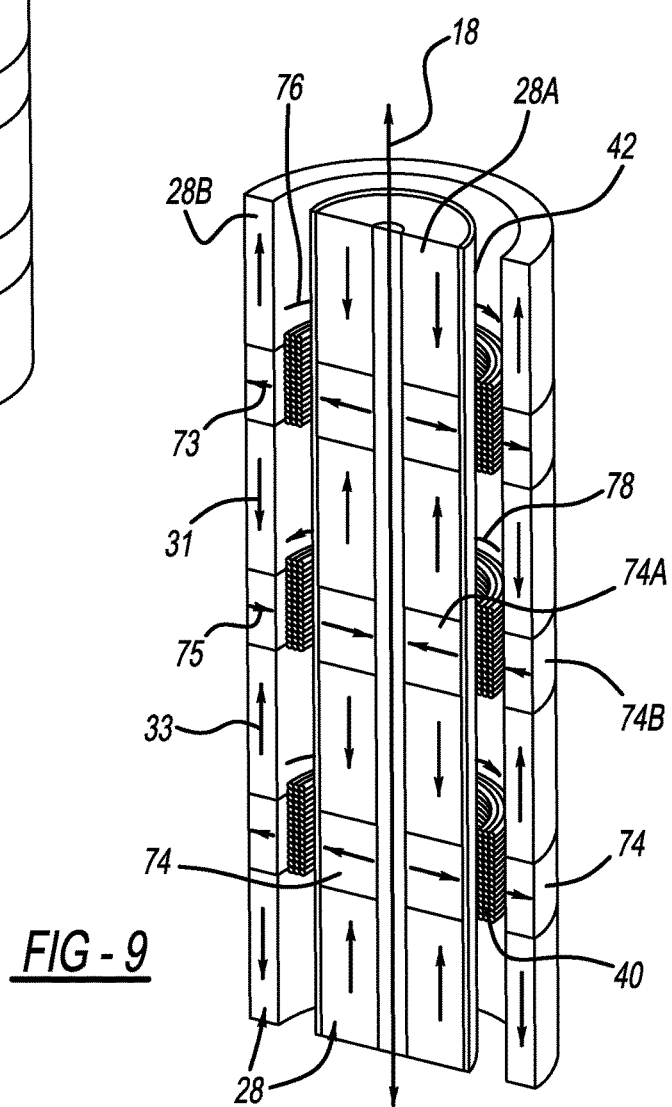
FIG. 9 is cross-sectional view of FIG. 8 along line 9-9.

With reference to FIGS. 8 and 9, to further maximize the variation in magnetic flux, the electromagnetic transducer 10 may include a dual Halbach magnetic assembly 80 with the coil assembly 72. The magnetic assembly 80 includes two magnet subassemblies 82, 84 (i.e., inner magnet subassembly 82 and outer magnet subassembly 84). The two magnet subassemblies 82, 84 each include axial magnets 28 and radial magnets 74 arranged in a Halbach array. The coil assembly 72 is disposed between the inner magnet subassembly 82 and the outer magnet subassembly 84.

The radial magnets 74A of the inner magnet subassembly 82 and the radial magnets 74B of the outer magnet subassembly 84 follow the same direction of magnetization, as shown in FIG. 9. The axial magnets 28A of the inner magnet subassembly 82 and the axial magnets 28B of the outer magnet subassembly 84 follow an opposite pattern of magnetization. For example, if the axial magnet 28A of the inner magnet subassembly 82 has magnetization in the upward direction, a horizontally adjacent axial magnet 28B of the outer magnet subassembly 84 has a magnetization in the downward direction. The rod 58, the inner magnet subassembly 82, and the outer magnet subassembly 84 are coupled together to move as one piece as the magnetic assembly 80.

The magnetic assembly 80 includes additional magnets with the Halbach array arrangement. The variation in magnetic flux generated by the magnetic assembly 80 is controlled by the four variables described and the inner diameter of the outer magnet subassembly 84. For a dual Halbach magnetic assembly 80 with the coil assembly 72, a correlation between an optimal coil length and the height of the axial magnet 28 and the radial magnets 74 is provided as coil length=height of the radial magnet+¼ height of the axial magnet.

Furthermore, similar to the magnetic assembly 70, the inner magnet subassembly 82 strengthens the electromagnetic field provided on the outer perimeter and substantially cancels the electromagnetic field at the center of the magnetic assembly 80. The outer magnet subassembly 84 performs in a similar manner as the inner magnet subassembly 82 but in opposite directions. Specifically, the outer magnet subassembly 84 strengthens the electromagnetic field at the inner perimeter and cancels the electromagnetic field at the outer perimeter. Accordingly, the inner magnet subassembly 82 and the outer magnet subassembly 84 strengthen the electromagnetic field between the two subassemblies 82, 84, thereby increasing the power output of the electromagnetic transducer 10.

As provided above, the frames 14, 16 of electromagnetic transducer 10 move along the central axis with respect to one each other. To minimize a tilting movement, the magnetic assembly 70 and the coil assembly 72 may be coupled to respective frame 14, 16 via a wire. For example, with reference to FIGS. 10 and 11, the magnetic assembly 70 is attached to the first frame 14 via a wire 90 while the coil assembly 72 is fixed to the frame 16 via, for example, chemical or mechanical means. Alternatively, the magnetic assembly 70 may be fixed to the first frame 14, and the coil assembly 72 is attached to the second frame by way of the wire 90.

The wire 90 is strong enough to pull one part of the electromagnetic transducer 10 (the magnetic assembly 70 or the coil assembly 72) backward or forward. For example, the wire 90 may have a tensile strain which is smaller than a vibrational amplitude of the vibration source 12. The wire 90 can absorb radial and torsional movements placed on the electromagnetic transducer 10, and transfer the axial movement. Specifically, as shown in FIG. 11, the wire 90 stretches to allow the axial movement of the electromagnetic transducer 10, while any radial movement is absorbed and not transferred to the transducer 10.

Figure 14:
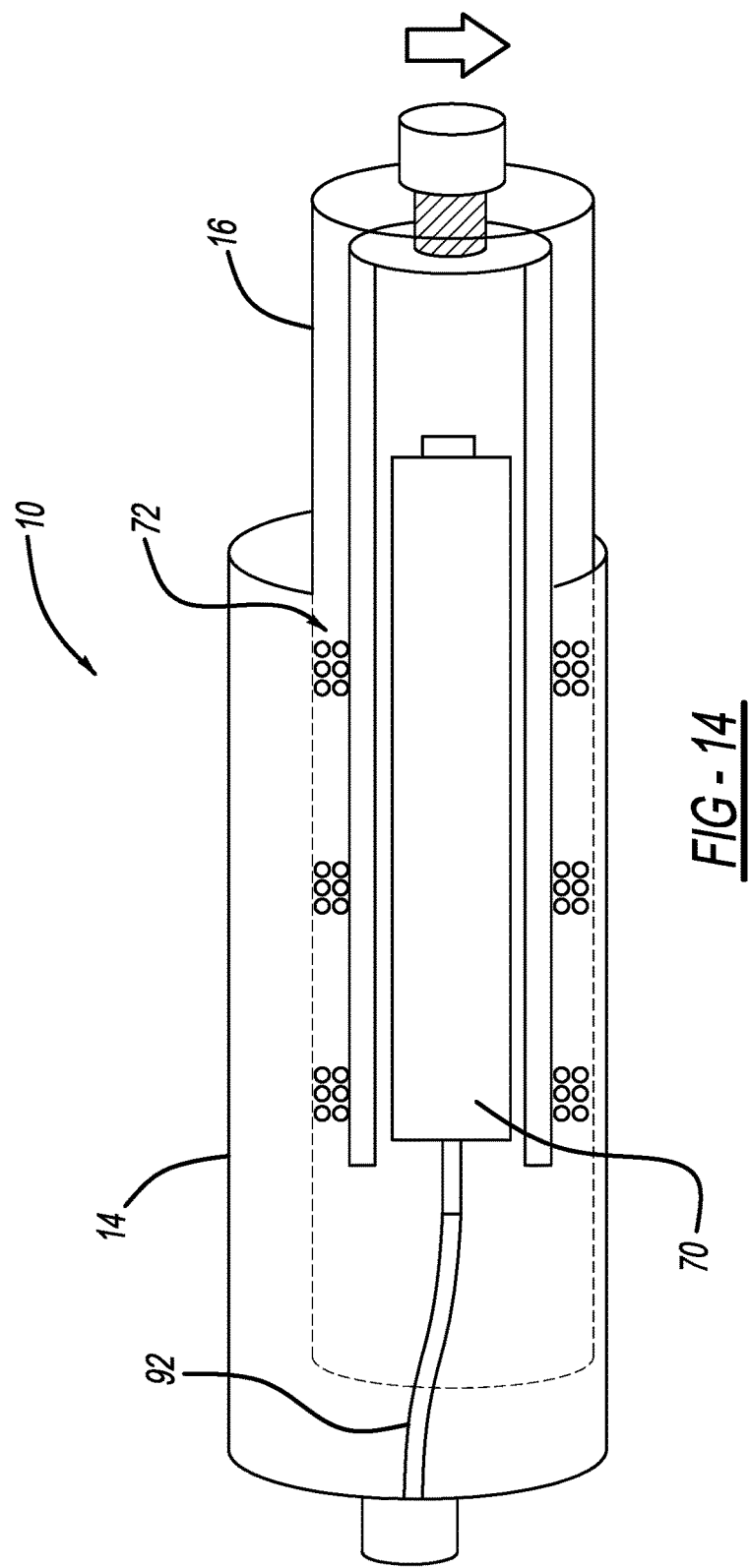

With reference to FIGS. 12-14, the magnetic assembly 70 can also be attached to the first frame 14 via a beam 92. The beam 92 may include an assembly of rigid and/or flexible mechanical components, such as a ball joint coupled to a rod. The beam 92 is aligned along the central axis, and allows radial displacement or tilting or torsional movements. Specifically, the beam 92 may decouple the radial displacement or tilting movement from the axial displacement of the two frames 14, 16, thereby having the electromagnetic transducer 10 move radially, as shown in FIGS. 13 and 14. The beam 92 prevents non-axial displacement of the vibrating source 12 from being transmitted to the electromagnetic transducer 10. The beam 92 may have a low tensile or compression strain compared to the vibration source 12 amplitude during forward and backward movements of the frames 14, 16, thereby preventing significant amplitude attenuation caused by axial deformation of the beam 92.

The beam 92 can apply both push and pull forces on to the magnetic assembly 70 (i.e., moveable part of the transducer 10), whereas the wire 90 applies either the push force or the pull force (i.e., not both) on to the moveable part. However, the wire can accommodate higher non-axial movements such as radial displacements than the beam 92.

While FIGS. 10-14 depict the electromagnetic transducer 10 having the magnetic assembly 70 and the coil assembly 72, any of the magnetic assemblies and the coil assemblies described herein may be utilized by the electromagnetic transducer 10 and utilize the wire 90 or the beam 92. Furthermore, while FIGS. 2-9 depict the magnetic assembly and the coil assembly as having cylindrical shape, the magnetic assembly and the coil assembly may have other suitable shapes for having the two assemblies move relative to each other.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, and devices to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, and/or components, but do not preclude the presence or addition of one or more other features elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An electromagnetic transducer comprising:
   a first frame defining a first opening and centered about a central axis;
   a second frame defining a second opening and centered about the central axis, wherein the second frame is concentrically disposed in the first opening of the first frame, and the first frame and the second frame are configured to move relative to each other;
   a magnetic assembly including an inner magnet subassembly and an outer magnet subassembly disposed in the inner magnet subassembly, wherein the inner magnet subassembly and the outer magnet subassembly are centered about the central axis, the inner magnet subassembly and the outer magnet subassembly each have a plurality of axial magnets arranged in a stacked configuration with a spacer disposed between axial magnets that are adjacent in a direction parallel with the central axis, the axial magnets have a magnetization parallel with the central axis, the axial magnets of the inner magnet subassembly and of the outer subassembly are arranged such that axial magnets that are adjacent in the direction parallel with the central axis have same poles facing each other, and the outer magnet subassembly has a pattern of magnetization inverse to the inner magnet subassembly;
   and a coil assembly centered along the central axis and concentrically disposed with the magnetic assembly, the coil assembly including an inner coil subassembly having one or more coils and an outer coil subassembly having one or more coils, wherein the inner coil subassembly is disposed between the inner magnet subassembly and the outer magnet subassembly, the outer coil subassembly is disposed around the outer magnet subassembly, the coil assembly and the magnetic assembly are housed in the second frame which is substantially disposed within the first frame, such that the coil assembly and the magnetic assembly move relative to each other.

2. The electromagnetic transducer of claim 1 wherein the magnetic assembly further comprises:
   a magnetic shield concentrically disposed around the outer coil assembly of the coil assembly.

3. The electromagnetic transducer of claim 1 wherein the coils of the inner coil assembly and of the outer coil assembly align with the spacers of the inner magnet assembly and the outer magnet assembly along an axis perpendicular to the central axis when the magnetic assembly and the coil assembly are stationary.

4. The electromagnetic transducer of claim 1 wherein the spacer is made of a ferromagnetic material.

5. The electromagnetic transducer of claim 1 wherein the magnetic assembly further comprises:
   a rod centered about the central axis is concentrically disposed in the inner magnet subassembly and is made of paramagnetic material.

6. The electromagnetic transducer of claim 1 wherein inner coil assembly and the outer coil assembly both include a tube, and the one or more coils of the inner coil assembly and of the outer coil assembly are arranged on the tubes.

7. The electromagnetic transducer of claim 1 wherein a given axial magneto the inner magnet subassembly has a magnetization in a direction opposite of a given axial magnet of the outer subassembly that is adjacent to the given axial magnet of the inner magnet subassembly in a direction perpendicular to the central axis.

8. The electromagnetic transducer of claim 1 wherein the magnetic assembly is coupled to the first frame and the coil assembly is coupled to the second frame.

9. The electromagnetic transducer of claim 1 wherein the coil assembly is coupled to the first frame and the magnetic assembly is coupled to the second frame.

10. An electromagnetic transducer comprising:
a first frame defining a first opening and centered about a central axis;
a second frame defining a second opening and centered about the central axis, wherein the second frame is concentrically disposed in the first frame, and the first frame and the second frame are configured to move relative to each other;
a magnetic assembly centered about the central axis and including a plurality of axial magnets and one or more radial magnets arranged in a stacked configuration, such that the plurality of axial magnets and the one or more radial magnets form a Halbach array; and
a coil assembly centered about the central axis and including one or more coils, wherein the magnetic assembly is concentrically disposed within the coil assembly, the coil assembly and the magnetic assembly are housed in the second frame which is substantially disposed within the first frame, such that the coil assembly and the magnetic assembly move relative to each other.

11. The electromagnetic transducer of claim 10 wherein the axial magnets of the magnetic assembly have a magnetization parallel with the central axis, and
the one or more radial magnets of the magnetic assembly have a magnetization perpendicular to the central axis.

12. The electromagnetic transducer of claim 10 wherein the magnetic assembly disposed in the coil assembly is an inner magnetic assembly, and the electromagnetic transducer further comprises:
an outer magnetic assembly centered about the central axis and concentrically disposed around the coil assembly, wherein the outer magnetic assembly is coupled to the inner magnetic assembly, the outer magnetic assembly includes a plurality of axial magnets and one or more radial magnets arranged in a stacked configuration, such that the plurality of axial magnets and the one or more radial magnets form the Halbach array, a given radial magneto the outer magnetic assembly has same magnetization direction as a given radial magnet of the inner magnetic assembly that is adjacent to the given radial magnet of the outer magnetic assembly in a direction perpendicular to the central axis, and a given axial magnet of the outer magnetic assembly has an opposite magnetization direction as a given axial magnet of the inner magnetic assembly that is adjacent to the given axial magnet of the outer magnetic assembly in the direction perpendicular to the central axis.

13. The electromagnetic transducer of claim 10 wherein the magnetic assembly is coupled to the first frame and the coil assembly is coupled to the second frame.

14. The electromagnetic transducer of claim 10 wherein the coil assembly is coupled to the first frame and the magnetic assembly is coupled to the second frame.

15. The electromagnetic transducer of claim 10 wherein the magnetic assembly further comprises:
a rod made of a paramagnetic material and centered about the central axis, and the axial magnets and the one or more radial magnets are concentrically disposed around the rod.

16. The electromagnetic transducer of claim 10 further comprising:
a wire, wherein the wire couples one of the first frame and the second frame to one of the magnetic assembly and the coil assembly.

17. The electromagnetic transducer of claim 10 further comprising:
a beam member having a rod moveable along an axis parallel with the central axis, wherein the beam member couples one of the first frame and the second frame to one of the magnetic assembly and the coil assembly.

18. The electromagnetic transducer of claim 10 wherein the coils of the coil assembly align with the radial magnets of the magnetic assembly along an axis perpendicular to the central axis when the magnetic assembly and the coil assembly are stationary.

19. An electromagnetic transducer comprising:
a first frame defining a first opening and centered about a central axis;
a second frame defining a second opening and centered about the central axis, wherein the second frame is concentrically disposed in the first frame, and the first frame and the second frame are configured to move relative to each other;
a magnetic assembly centered about the central axis and including an inner magnet subassembly and an outer magnet subassembly, wherein the inner magnet subassembly and the outer magnet subassembly are coupled together, the inner magnet subassembly and an outer magnet subassembly each include a plurality of axial magnets and one or more radial magnets arranged in a stacked configuration, such that the plurality of axial magnets and the one or more radial magnets form a Halbach array, a given radial magnet of the outer magnet subassembly has same magnetization direction as a given radial magnet of the inner magnet subassembly that is adjacent to the given radial magnet of the outer magnet subassembly in a direction perpendicular to the central axis, and a given axial magnet of the outer magnet subassembly has an opposite magnetization direction as a given axial magnet of the inner magnet subassembly that is adjacent to the given axial magnet of the outer magnet subassembly in the direction perpendicular to the central axis; and
a coil assembly centered about the central axis and including one or more coils, wherein the coil assembly is disposed between the inner magnet subassembly and the outer magnet subassembly of the magnetic assembly, the coil assembly and the magnetic assembly are housed in the second frame which is substantially disposed within the first frame, such that the coil assembly and the magnetic assembly move relative to each other.

20. The electromagnetic transducer of claim 19 wherein the axial magnets of the magnetic assembly have a magnetization parallel with the central axis, and
the one or more radial magnets of the magnetic assembly have a magnetization perpendicular to the central axis.

21. The electromagnetic transducer of claim 19 wherein the coils of the coil assembly align with the radial magnets of the magnetic assembly along an axis perpendicular to the central axis when the magnetic assembly and the coil assembly are stationary.

\* \* \* \* \*